US011544530B2

(12) United States Patent
Cheng et al.

(10) Patent No.: US 11,544,530 B2
(45) Date of Patent: Jan. 3, 2023

(54) SELF-ATTENTIVE ATTRIBUTED NETWORK EMBEDDING

(71) Applicant: NEC Laboratories America, Inc., Princeton, NJ (US)

(72) Inventors: Wei Cheng, Princeton Junction, NJ (US); Wenchao Yu, Plainsboro, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 596 days.

(21) Appl. No.: 16/662,754

(22) Filed: Oct. 24, 2019

(65) Prior Publication Data

US 2020/0134428 A1 Apr. 30, 2020

Related U.S. Application Data

(60) Provisional application No. 62/752,379, filed on Oct. 30, 2018, provisional application No. 62/751,875, filed on Oct. 29, 2018.

(51) Int. Cl.
*G06N 3/04* (2006.01)
*G06K 9/62* (2022.01)
*G06N 20/00* (2019.01)

(52) U.S. Cl.
CPC ......... *G06N 3/0454* (2013.01); *G06K 9/6267* (2013.01); *G06N 20/00* (2019.01)

(58) Field of Classification Search
CPC ...... G06N 3/0454; G06N 20/00; G06N 3/084; G06N 7/005; G06N 3/0445; G06N 3/088; G06K 9/6267; G06K 9/6215; G06K 9/6248; G06V 10/82
See application file for complete search history.

(56) References Cited

U.S. PATENT DOCUMENTS

| 10,769,501 | B1* | 9/2020 | Ando | G06K 9/6215 |
| 2020/0074246 | A1* | 3/2020 | Goyal | G06K 9/6274 |
| 2021/0241100 | A1* | 8/2021 | Hopkins | G06N 3/04 |

FOREIGN PATENT DOCUMENTS

| CN | 110555305 A | * | 12/2019 | |
| WO | WO-2018035058 A1 | * | 2/2018 | G01C 21/20 |

OTHER PUBLICATIONS

Aditya Grover et al., "node2vec: Scalable Feature Learning for Networks", KDD '16, San Francisco, CA, USA, Aug. 2016.
Xiao Huang et al., "Accelerated Attributed Network Embedding", Proceedings of the 2017 SIAM International Conference on Data Mining, Apr. 2017.
Bryan Perozzi et al., "DeepWalk: Online Learning of Social Representations", arXiv:1403.6652v2 [cs.SI], Jun. 2014.
(Continued)

*Primary Examiner* — Michael A Keller
(74) *Attorney, Agent, or Firm* — Joseph Kolodka (57) ABSTRACT

Methods and systems for determining a network embedding include training a network embedding model using training data that includes topology information for networks and attribute information relating to vertices of the networks. An embedded representation is generated using the trained network embedding model to represent an input network, with associated attribute information, in a network topology space. A machine learning task is performed using the embedded representation as input to a machine learning model.

18 Claims, 6 Drawing Sheets

(56) References Cited

OTHER PUBLICATIONS

Jian Tang et al., "LINE: Large-scale Information Network Embedding", arXiv:1503.03578v1 [cs.LG], Mar. 2015.
Daixin Wang et al., "Structural Deep Network Embedding", KDD '16, San Francisco, CA, USA, Aug. 2016.
Cheng Yang et al., "Network Representation Learning with Rich Text Information", Proceedings of the Twenty-Fourth International Joint Conference on Artificial Intelligence, Jun. 2015.
Wenchao Yu et al. "Learning deep network representations with adversarially regularized autoencoders" in Proceedings of the 24th ACM SIGKDD International Conference on Knowledge Discovery & Data Mining, pp. 2663-2671, Jul. 2018 (abstract: sections 3-4 and figure 1).
Yupei Wang et al. "Skeleton key: Image captioning by skeleton-attribute decomposition", in Proceedings of the IEEE Conference on Computer Vision and Pattern Recognition, pp. 7272-7278, Nov. 9, 2017 (section 3 and figures 1-2).

* cited by examiner

SELF-ATTENTIVE ATTRIBUTED NETWORK EMBEDDING

RELATED APPLICATION INFORMATION

This application claims priority to U.S. Provisional Patent Application No. 62/751,875, filed on Oct. 29, 2018, and to U.S. Provisional Patent Application No. 62/752,379, filed on Oct. 30, 2018, both incorporated herein by reference herein their entirety.

BACKGROUND

Technical Field

The present invention relates to representing network topologies in machine learning, and more particularly to using adversarial learning to efficiently learn vertex embeddings on attributed networks.

Description of the Related Art

Network embedding is a challenge in many machine learning tasks. However, existing approaches learn node representations based only on the topological structure.

SUMMARY

A method for determining a network embedding includes training a network embedding model using a processor, based on training data that includes topology information for networks and attribute information relating to vertices of the networks. An embedded representation is generated using the trained network embedding model to represent an input network, with associated attribute information, in a network topology space. A machine learning task is performed using the embedded representation as input to a machine learning model.

A system for determining a network embedding includes a model trainer configured to train a network embedding model using training data that includes topology information for networks and attribute information relating to vertices of the networks. The network embedding model is configured to generate an embedded representation to represent an input network, with associated attribute information, in a network topology space. A machine learning model is configured to perform a machine learning task using the embedded representation output by the network embedding model as input.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide machine learning systems that use rich attributes of a network, in addition to the network topological structure, to embed the network in a form that can be used by the machine learning model. The network embedding is a low-dimensional representation of vertices in the network that benefits downstream tasks, such as vertex classification and link prediction. The use of the rich attributes that are available in real-world networks is complementary in learning better embedding representations, especially when the network is highly sparse. Interpretability is also important for data fusion on network structure and attribute information.

Toward that end, the present embodiments use an adversarial, regularized embedded learning approach that efficiently learns vertex embeddings on attributed networks via adversarial learning. The present embodiments capture network structure by jointly considering both locality-preserving and global reconstruction constraints in network topology space and attribute space.

In particular, a deep model captures the underlying high non-linearity of both the topological structure and the attributes. The proposed model enforces the learned vertex representations to preserve locality from the original networks. In addition, to learn a consistent and complementary representation from the topological structure and attributes of the network, the present embodiments combine these two kinds of information to encapsulate the join inference in a generative adversarial training process.

The deep model employs two deep autoencoding architectures, to capture the underlying non-linearities. A discrete recurrent neural network (RNN) autoencoder is used to learn a continuous vertex representation distribution in a topology space, with sampled sequences of vertices as inputs. A multilayer perceptron (MLP) autoencoder is used in parallel with the RNN autoencoder to learn the distribution in an attribute space. The interactions of attributes among different fields are modeled using a self-attention mechanism.

Figure 1:
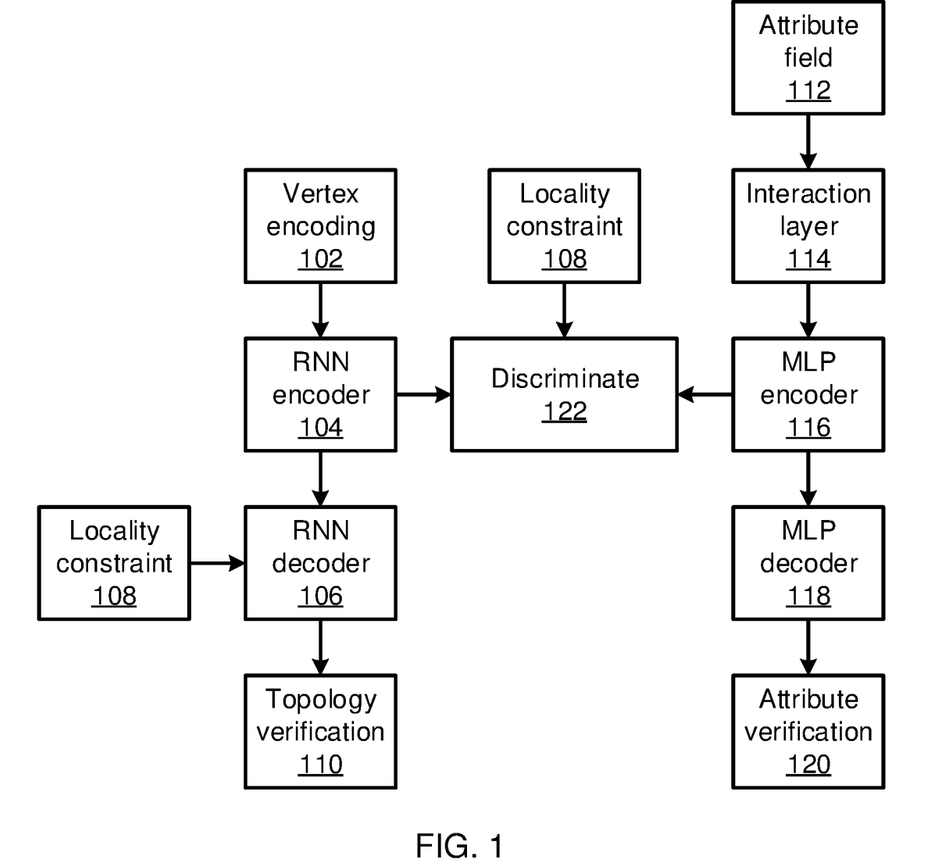
FIG. 1 is a block diagram of a network embedding neural network that is configured to capture network topology information and network attribute information in accordance with an embodiment of the present invention.

Referring now in detail to the figures in which like numerals represent the same or similar elements and initially to FIG. 1, a deep learning model is illustratively depicted in accordance with one embodiment of the present invention.

The deep learning model includes two parallel autoencoder structures. In an RNN autoencoder structure, each vertex of a network is encoded to provide vertex encodings 102. These vertex encodings 102 are used as input to an RNN encoder 104. An RNN decoder 106 uses the output of the RNN encoder 104, along with a locality constraint 108, to generate a reconstructed set of vertices, which can be used to verify the operation of the RNN autoencoder in block 110 by comparing the reconstructed vertices to the encoded vertices. This provides feedback for training the RNN autoencoder. The locality constraint 108 preserves neighborhood proximity from the original network structure.

In an MLP autoencoder structure, a table of vertex attributes 112 is processed by an interaction layer 114. Interaction layer 114 models the interactions between attributes among different fields using a self-attention mechanism. The output of the interaction layer is processed by MLP encoder 116 to form an encoding of the attributes. MLP decoder 118 then decodes the encoded attributes to generate reconstructed attributes for attribute verification in block 120. The encoded vertices generated by the RNN encoder 104 and the encoded attributes generated by the MLP encoder 116 are used as input to discriminator 122.

As noted above, network embedding learns representations that encode structural information of a network. Network embedding learns a mapping that embeds vertices of the network as points in a low-dimensional space. Given an encoded vertex set $\{x^{(1)}, \ldots, x^{(n)}\}$, finding an embedding $f_\phi(x^{(i)})$ of each $x^{(i)}$ can be formalized as an optimization problem:

$$\min_{\phi,\psi} \sum_{1 \leq i < j \leq n} \mathcal{L}(f_\phi(x^{(i)}), f_\psi(x^{(j)}), \varphi_{ij}) + \lambda \cdot \mathcal{R}(\psi, x)$$

where $f_\phi(x) \in \mathbb{R}^d$ is the d-dimensional embedding result for a given input x, $\mathcal{L}(\cdot)$ is the loss function between a pair of inputs, $\varphi_{ij}$ is the weight between $x^{(i)}$ and $x^{(j)}$, and $\mathcal{R}(\cdot)$ serves as a regularizer such as an autoencoder. The present embodiments make use of Laplacian eigenmaps as a loss function to preserve the locality property of the network structure. The embedding can be obtained by minimizing the following objective function:

$$\mathcal{L}_{LE}(\phi; x) = \sum_{1 \leq i < j \leq n} \|f_\phi(x^{(i)}) - f_\phi(x^{(j)})\|^2 \varphi_{ij}$$

where $\phi$ and $\psi$ are parameters of the encoder and decoder functions, respectively, in network topology space, where $\lambda$ is a user-determined hyper-parameter (e.g., fixed using cross-validation), and where n is a total number of nodes in the graph.

Generative adversarial networks (GANs) build an adversarial training platform for two players, namely the generator $g_\theta(\cdot)$ and the discriminator $d_w(\cdot)$, to play a minmax game. The variables $\theta$ and w represent model parameters.

$$\min_\theta \max_w \mathbb{E}_{x \sim \mathbb{P}_{data}(x)}[\log d_w(x)] + \mathbb{E}_{z \sim \mathbb{P}_g(z)}[\log(1 - d_w(g_\theta(z)))]$$

The generator $g_\theta(\cdot)$ attempts to map noise to the input space as closely as the true data, while the discriminator $d_w(x)$ represents the probability that x comes from the data, rather than from the noise. The discriminator 122 aims to distinguish the real data distribution $\mathbb{P}_{data}(x)$ and the noise-generated sample distribution $\mathbb{P}_g(z)$, where $z \sim \mathcal{N}(0,1)$. The Jensen-Shannon divergence can be used by GANs, but is known to suffer from training instability. To overcome this, Wasserstein GANs use the earth-mover distance and solve the problem:

$$\min_\theta \max_{w \in \mathcal{W}} \mathbb{E}_{x \sim \mathbb{P}_{data}(x)}[d_w(x)] + \mathbb{E}_{z \sim \mathbb{P}_g(z)}[d_w(g_\theta(z))]$$

The Lipschitz constraint $\mathcal{W}$ on the discriminator can be kept by clipping the weights of the discriminator within a compact space.

In the following discussion, an attributed network with n vertices is expressed as $G(\mathcal{V}, \varepsilon, Z)$, where $\varepsilon$ is the set of network edges and $Z \in \mathbb{R}^{n \times d_0^a}$ is an attribute matrix, with $z = Z_i \in \mathbb{R}^{n \times d_0^a}$ representing the attribute vector of the $i^{th}$ vertex. The encoded vectors are expressed as $X \in \mathbb{R}^{n \times d_0^g}$, for example encoded by a lookup table or by one-hot encoding. The vector $x = X_i \in \mathbb{R}^{d_0^g}$ denotes the vector representation of the $i^{th}$ vertex. A random walk generator is used to obtain truncated random walks on the network, expressed as sequences of vertices, that are rooted from each verted $v \in \mathcal{V}$ in $G(\mathcal{V}, \varepsilon, Z)$. A walk can be sampled randomly from the neighbors of the last visited vertex until a preset maximum length is reached.

Given a network $G(\mathcal{V}, \varepsilon, Z)$, vertices of similar attributes are likely to be close to one another (e.g., connected by edges) than dissimilar ones. That is, the low-dimensional vertex representations of $\{X_i\}_{i=1}^n$ are drawn from a distribution similar to that of the representations of the attributes $\{Z_i\}_{i=1}^n$. It is assumed that the formation of a network is highly correlated with vertex attributes, such that leveraging vertex attribute information can improve network embedding performance. Therefore, the present embodiments learn a low-dimensional vertex embedding that is based on the network topology $G(\cdot)$ and the attribute matrix Z, such that the learned representations can preserve the proximity in existing in both the network topology space and the attribute space. Both network structure and attribute information can be viewed as latent factors to drive the formation of the network.

The learned representation of the network topological structure can be expressed as $f_\phi^g(x)$, and the learned representation of the network attribute information can be expressed as $f_\theta^a(z)$. A mapping is learned, $f\{X, Z\} \to M$, by minimizing the disagreement $\mathcal{L}(f_\phi^g(X), f_\theta^a(Z))$ between the learned topology space and structure space. $M \in \mathbb{R}^{n \times d}$ is the resultant representation matrix. Each row of M can be viewed as a vertex feature vector.

The RNN autoencoder structure is used to learn a continuous vertex representation distribution in the topology space with sampled sequences of vertices as inputs. The RNN autoencoder can be trained individually by minimizing the negative log-likelihood of reconstruction, which is indicated by cross entropy loss in the implementation as:

$$\mathcal{L}_{AE}^{(g)}(\phi, \psi; x) = -\mathbb{E}_{x \sim \mathbb{P}_{graph}(x)}[dist(x, h_\psi^{(g)}(f_\phi^{(g)}(x)))]$$

where $dist(x,y) = x \log y + (1-x) \log(1-y)$. In this case, x is a sampled batch from training data, $f_\phi^{(g)}(x)$ is the embedded latent representation of x, and $\phi$ and $\psi$ are parameters of the encoder and decoder functions in the network topology space, respectively.

Similarly, in the attribute space, the MLP autoencoder structure is adopted to learn the distribution:

$$\mathcal{L}_{AE}^{(a)}(\phi, \xi; z) = -\mathbb{E}_{z \sim \mathbb{P}_{attribute}(z)}[dist(z, h_\xi^{(a)}(f_\theta^{(a)}(z)))]$$

where θ and ξ are parameters of the encoder and decoder functions in the attribute space, respectively.

During training of the RNN autoencoder, not only are the encoder and decoder updated, but the locality-preserving loss 108 is also jointly minimized:

$$\mathcal{L}_{LE}(\phi; x) = \sum_{1 \leq i < j \leq n} \left\| f_\phi^{(g)}(X_i) - f_\phi^{(g)}(X_j) \right\|^2 \varphi_{ij}$$

where $f_\phi^{(g)}(x) \in \mathbb{R}^d$ is the embedding result for a given input x and $\phi_{ij}$ is the weight between vertices i and j.

To minimize the discrepancies between attribute distribution and network topology distribution, the present embodiments use a generative adversarial training process as a complementary regularizer. Advantages include guiding the extraction of useful information from data and providing a more robust discrete-space representation learning that can address the overfitting problem on sparsely sampled walks. The present embodiments thus introduce a discriminator 122 in the latent space which separates generated vectors from the encoder network $f_\phi^{(g)}(\cdot)$ with network topology and the encoder network $f_\theta^{(a)}(\cdot)$ with attributes.

$f_\theta^{(g)}(x) \sim \mathbb{P}_\phi(x)$ is a sample drawn from the distribution of the network space $\mathbb{P}_\phi(x)$ and $f_\theta^{(a)}(z) \sim \mathbb{P}_\theta(z)$ denotes a sample drawn from the distribution of the attribute space $l_\theta(z)$. The dual form of the earth mover distance between $l_\phi(x)$ and $l_\theta(z)$ can be determined as follows:

$$W(\mathbb{P}_\phi(x), \mathbb{P}_\theta(z)) = \sup_{\|d(\cdot)\|_{L \leq 1}} \mathbb{E}_{y \sim \mathbb{P}_\phi(x)}[d(y)] - \mathbb{E}_{y \sim \mathbb{P}_\theta(z)}[d(y)]$$

where $\|d(\cdot)\|_{L \leq 1}$ is the Libschitz continuity constraint, with Lipschitz constant 1. If a family of functions $\{d_w(\cdot)\}$ $w \in \mathcal{W}$ are all K-Lipschitz for some K, then:

$$W(\mathbb{P}_\phi(x), \mathbb{P}_\theta(z)) \propto \max_{w \in \mathcal{W}} \mathbb{E}_{x \sim \mathbb{P}_{graph}(x)}\left[d_w\left(f_\phi^{(g)}(x)\right)\right] + \mathbb{E}_{z \sim \mathbb{P}_{attribute}(z)}[d_w(f_\theta^{(a)}(z))]$$

Parameterized encoders $f_\phi^{(g)}(x)$ and $f_\theta^{(a)}(z)$ can be used as generators, with the training of generator and discriminator being performed separately. The cost function for the generators can be defined by:

$$\mathcal{L}_{GEN}(\theta, \phi; x, z) = \mathbb{E}_{x \sim \mathbb{P}_{graph}(x)}[d_w(f_\phi^{(g)}(x)] - \mathbb{E}_{z \sim \mathbb{P}_{attribute}(z)}[d_w(f_\phi^{(g)}(x)]$$

Similarly, the cost function of the discriminator can be defined by:

$$\mathcal{L}_{DIS}(w; x, z) = -\mathbb{E}_{x \sim \mathbb{P}_{graph}(x)}[d_w(f_\phi^{(g)}(x)] + \mathbb{E}_{z \sim \mathbb{P}_{attribute}(z)}[d_w(f_\phi^{(g)}(x)]$$

The present embodiments learn smooth representations by jointly minimizing the reconstruction errors of the autoencoders within an adversarial training process.

To learn smooth representations by jointly minimizing the reconstructions of the autoencoders and the locality-preserving loss, the joint optimization problem may be expressed as:

$$\mathcal{L}(\phi, \theta, \psi, \xi, w) = \mathcal{L}_{AE}^{(g)}(\phi, \psi; x) + \mathcal{L}_{AE}^{(a)}(\theta, \xi; z) + \lambda_1 \mathcal{L}_{LE}(\phi; x) + \lambda_2 W(\mathbb{P}_{\phi(x)}, \mathbb{P}_{\theta(z)})$$

where $\lambda_1$ and $\lambda_2$ are hyper-parameters that control the importance of different losses.

To learn the interactions among vertex attributes (cross features), an interaction layer 114 is used in attribute space. In the interaction layer 114, self-attention is used to map the attributes of different fields with weighted sums to the output by computing the similarity against different attribute fields. With p being the total number of fields in the input attributes, for each field $\{z_0^{(i)}\}_{i=1}^{p}$, a linear mapping function $\Phi(\cdot)$ is used to map the field to a low-dimensional dense vector $\Phi(z_0^{(i)}) \in \mathbb{R}^{d_1^a}$. By applying the mapping function on all fields, the output of one instance I would be a concatenation of multiple embedding vectors denoted by $Z_{0_i} = \Phi([z_0^{(1)}, z_0^{(2)}, \ldots, z_0^{(p)}])$.

The scaled dot-product attention is used to compute the outputs with attention weights. This self-attention mechanism includes three parts, the queries Q, the keys K, and the values V. All of these parts are derived from the same embedding $Z_0$ with ReLU activation, such that $Q = \text{ReLU}(Z_0 W_q)$, $K = \text{ReLU}(Z_0 W_k)$, and $V = \text{ReLU}(Z_0 W_v)$, where $W_q, W_k, W_v \in \mathbb{R}^{d_1^{(a)} \times d_1^{(a)}}$ are parameters to be learned. The attention map is then determined using queries and keys. Each entry of the attention map represents the interaction intensity of attributes between two different fields. The output of the self-attention module is computed together with the values:

$$Z = \sigma\left(\frac{QK^T}{\sqrt{d_i^{(a)}}}\right) V$$

where $\sigma(\cdot)$ is the Softmax function. Additionally, an attribute field may also be involved in the interaction in different representation subspaces. Multi-headed attention is used because it allows the model to jointly attend to information from different subspaces. The final output from the interaction layer is defined as:

$$Z = \sigma\left(\frac{Q_1 K_1^T}{\sqrt{d_1^{(a)}}}\right) V_1 \oplus \sigma\left(\frac{Q_2 K_2^T}{\sqrt{d_1^{(a)}}}\right) V_2 \oplus \ldots \oplus \sigma\left(\frac{Q_h K_h^T}{\sqrt{d_1^{(a)}}}\right) V_h \oplus Z_0$$

where $\oplus$ denotes concatenation, h is the number of heads, $Z \in \mathbb{R}^{\wedge}(n \times d_0^{(a)}}$, and $d_0^{(a)} = (h+1) \times p \times d_1^{(a)}$.

$\mathbb{P}_\theta(z)$ is the distribution of $f_\theta^{(a)}(z)$, where z is a sample drawn from the distribution $\mathbb{P}_{attribute}(z)$, and $f_\theta^{(a)}(\cdot)$ is a function satisfying the local Lipschitz constants $\mathbb{E}_{z \sim \mathbb{P}_g(z)}[L(\theta, z)] < +\infty$. Then:

$$\nabla_\theta \mathcal{L} = -\nabla_\theta \mathbb{E}_{x \sim \mathbb{P}_{attribute}(x)}[dist(x, h_\xi^{(a)}(f_\theta^{(a)}(x)))] - \lambda_2 \nabla_\theta \mathbb{E}_{z \sim \mathbb{P}_{attribute}(z)}[d_w(f_\theta^{(a)}(z))]$$

$$\nabla_w \mathcal{L} = -\lambda_2 \nabla_w \mathbb{E}_{x \sim \mathbb{P}_{graph}(x)}\left[d_w\left(f_\phi^{(g)}(z)\right)\right] + \lambda_2 \nabla_w \mathbb{E}_{z \sim \mathbb{P}_{attribute}(z)}[d_w(f_\theta^{(a)}(z))]$$

$$\nabla_\theta \mathcal{L} = \lambda_1 \nabla_\phi \sum_{1 \leq i < j \leq n} \left\|f_\phi^{(g)}(X_i) - f_\phi^{(g)}(X_j)\right\|^2 \varphi_{ij} - \nabla_\phi \mathbb{E}_{x \sim \mathbb{P}_{graph}(x)}$$

$$[dist(x, h_\phi^{(g)}(f_\phi^{(g)}(x)))] + \lambda_2 \nabla_\theta \mathbb{E}_{z \sim \mathbb{P}_{graph}(x)}[d_w(f_\phi^{(g)}(x))]$$

$$\nabla_\psi \mathcal{L} = -\nabla_\psi \mathbb{E}_{x \sim \mathbb{P}_{graph}(x)}[dist(x, h_\psi^{(g)}(f_\phi^{(g)}(x)))]$$

$$\nabla_\xi \mathcal{L} = -\nabla_\xi \mathbb{E}_{x \sim \mathbb{P}_{attribute}(x)}[dist(x, h_{\xi i}^{(a)}(f_\theta^{(a)}(x)))]$$

The joint architecture uses a dedicated training objective for each part. To train the model, block coordinate descent can be used to alternate between optimizing different parts of the model. For the RNN autoencoder reconstruction error in the network topology space $\mathcal{L}_{AE}^{(g)}(\phi,\psi;x)$ and the locality-preserving loss $\mathcal{L}_{LE}(\phi;x)$, the parameters $\phi$ and $\psi$ are updated. For the MPL autoencoder reconstruction error in the attribute space $\mathcal{L}_{AE}^{(a)}(\theta,\xi;z)$, the parameters $\theta$ and $\xi$ are updated. The interaction layer 114 is optimized as an end-to-end model. For the discriminator 122, the parameter w is updated. For the RNN encoder and the MLP encoder, the parameters $\phi$ and $\theta$ are updated.

Figure 2:
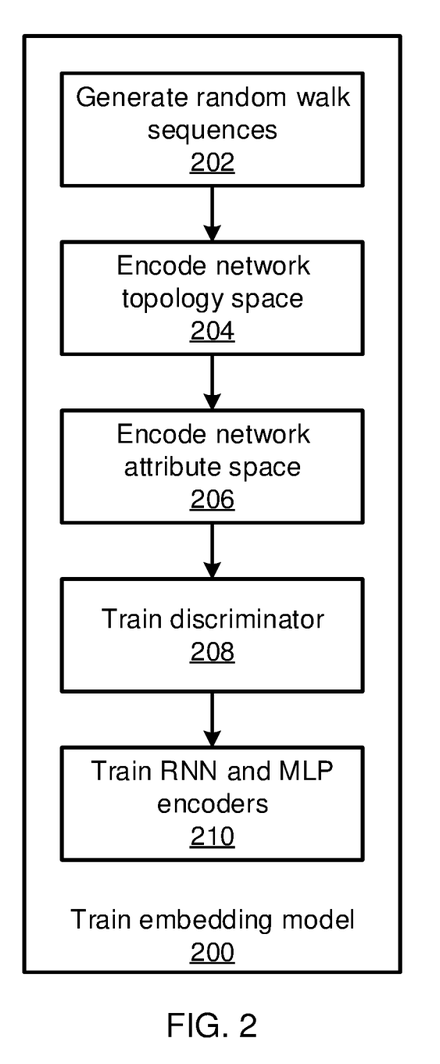
FIG. 2 is a block/flow diagram of a method for training a network embedding model using adversarial training between a network topology autoencoder and a network attribute autoencoder in accordance with an embodiment of the present invention.

Referring now to FIG. 2, a method of training the embedding model 200 is shown. Block 202 generates random walk sequences from the network graph, each sequence being a series of randomly or pseudo-randomly selected steps between neighboring vertices in the network graph, starting from a randomly or pseudo-randomly selected vertex.

Block 204 encodes the network topology in a topology space. Block 204 samples $\{x^{(i)}\}_{i=1}^{B} \sim \mathbb{P}_{graph}(x)$ from the random walks from a single batch B and computes a latent representation $f_\phi^{(g)}(x^{(i)})$. A reconstruction output $h_\psi^{(g)}(f_\phi^{(g)}(x^{(i)}))$ is determined and the losses $\mathcal{L}_{AE}^{(g)}(\phi,\psi;x)$ and $\mathcal{L}_{LE}(\phi;x)$ are calculated as described above. The loss is backpropagated and the parameters $\phi$ and $\psi$ are updated using the respective differentials described above.

Block 206 encodes the vertex attributes in an attribute space. The output Z of the interaction layer 114 is determined as described above. Block 206 samples $\{z^{(i)}\}_{i=1}^{B} \sim \mathbb{P}_{attribute}(z)$ from the attribute vectors from a single batch B and computes the) latent representation $f_\theta^{(a)}(z^{(i)})$. A reconstruction output $h_\xi^{(a)}(f_\theta^{(a)}(z^{(i)}))$ is determined and the loss $\mathcal{L}_{AE}^{(a)}(\theta,\xi;z)$ is calculated as described above. The loss is backpropagated and the parameters $\theta$ and $\xi$ are updated using the respective differentials described above.

Block 208 trains the discriminator 122. Block 208 samples $\{x^{(i)}\}_{i=1}^{B} \sim \mathbb{P}_{graph}(x)$ from the random walks and $\{z^{(i)}\}_{i=1}^{B} \sim \mathbb{P}_{attribute}(z)$ from the attribute vectors and computes the respective representations $f_\phi^{(g)}(x^{(i)})$ and $f_\theta^{(a)}(z^{(i)})$. A discriminator loss $\mathcal{L}_{DIS}(w;x,z)$ is calculated as described above and is backpropagated. The parameter w is updated using the differential described above. This is repeated for a number of discriminator training iterations.

Block 210 jointly trains the RNN encoder 104 and the MLP encoder 116 using adversarial training. Block 210 samples $\{x^{(i)}\}_{i=1}^{B} \sim \mathbb{P}_{graph}(x)$ from the random walks and $\{z^{(i)}\}_{i=1}^{B} \sim \mathbb{P}_{attribute}(z)$ from the attribute vectors and computes the respective representations $f_\phi^{(g)}(x^{(i)})$ and $f_\theta^{(a)}(z^{(i)})$. A generator loss $\mathcal{L}_{GEN}(\theta,\phi;x,z)$ is calculated as described above and is backpropagated. The parameters $\theta$ and $\phi$ are updated again using the above differentials.

The training of block 200 is repeated across a number of training epochs until a maximum number of iterations is reached.

Using this generative adversarial training, the latent space of the RNN autoencoder provides an optimal embedding of the network vertices with guided information from the attribute space. The use of the RNN encoder in the topology space takes the vertex order information from the sampled random walks. After the training, vertex representations $f_\phi^{(g)}(x^{(i)})$ are determined by passing the input walks through the RNN encoder 104. The adversarial training process is equivalent to optimizing the optimal transport cost between the input and output distributions of the RNN and MLP autoencoders, which forces the latent embeddings in topology space and attribute space to follow the same prior distribution.

Figure 3:
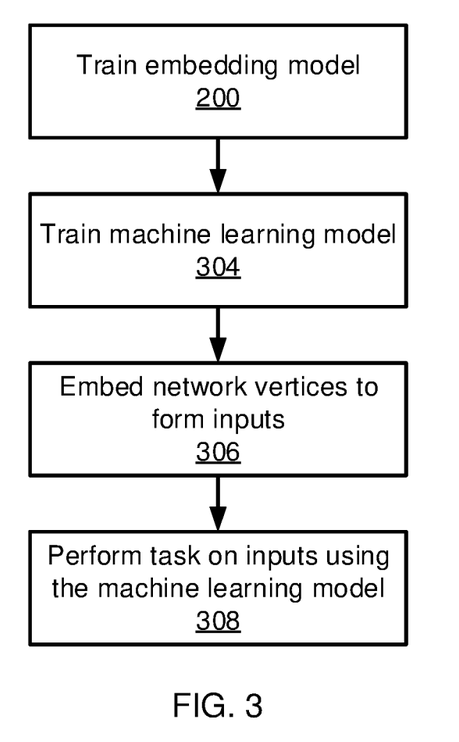
FIG. 3 is a block/flow diagram of a method for performing a machine learning task using a network embedding model that captures network topology information and network attribute information in accordance with an embodiment of the present invention.

Referring now to FIG. 3, a method for performing a machine learning task is shown. Block 200 trains a network embedding model, as described above. Block 304 then trains an appropriate machine learning model in accordance with a particular task to be performed and a set of associated training data. The training data can be processed using the trained embedding model to generate embeddings that can be used with the machine learning model. It should be understood that, although neural networks are specifically contemplated as being used to implement the network embedding model and the machine learning model, any appropriate machine learning model can be used instead.

Once the models are trained, block 306 accepts new network vertices and their attributes and uses the trained embedding model to form associated representations. Block 308 uses the representations as inputs to the trained machine learning model to perform a task. Such tasks can include, for example, network reconstruction, multi-label classification, and link prediction.

For example, if block 308 performs classification, vertex features can be used as input to a one-vs-rest logistic regression to train the machine learning model in block 306. To make a comprehensive evaluation, sets of 10%, 30%, and 50% of the total number of vertices are selected as a training set, with the remaining number of vertices in each case being used as a test set. Evaluation metrics can include, e.g., Micro-F1 and Macro-F1. The present network embeddings outperform other embedding approaches on the vertex classification task. Vertex attribute information contributes substantially to classification and provides superior accuracy if both network topology and attributes are considered.

If block 308 performs link prediction, the objective is to infer missing edges in a network that has had a certain fraction of edges removed. For example, if 20% of edges are randomly removed from a network, these edges serve as positive samples, with an equal number of vertex pairs without edges between them being negative samples. With the vertex representation learned by the network embedding in block 306, block 308 determines a link prediction ranking sore from the $\ell_2$ norm of two vertex vectors. The present embodiments outperform existing approaches by a substantial margin, in some experiments providing a 3% to % 19 improvement.

The present embodiments thereby provide a distinct advantage over systems that consider only network topology and provide superior accuracy in any appropriate machine learning task.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

Embodiments of the present invention can be implemented using artificial neural networks (ANNs). In general terms, an ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 4:
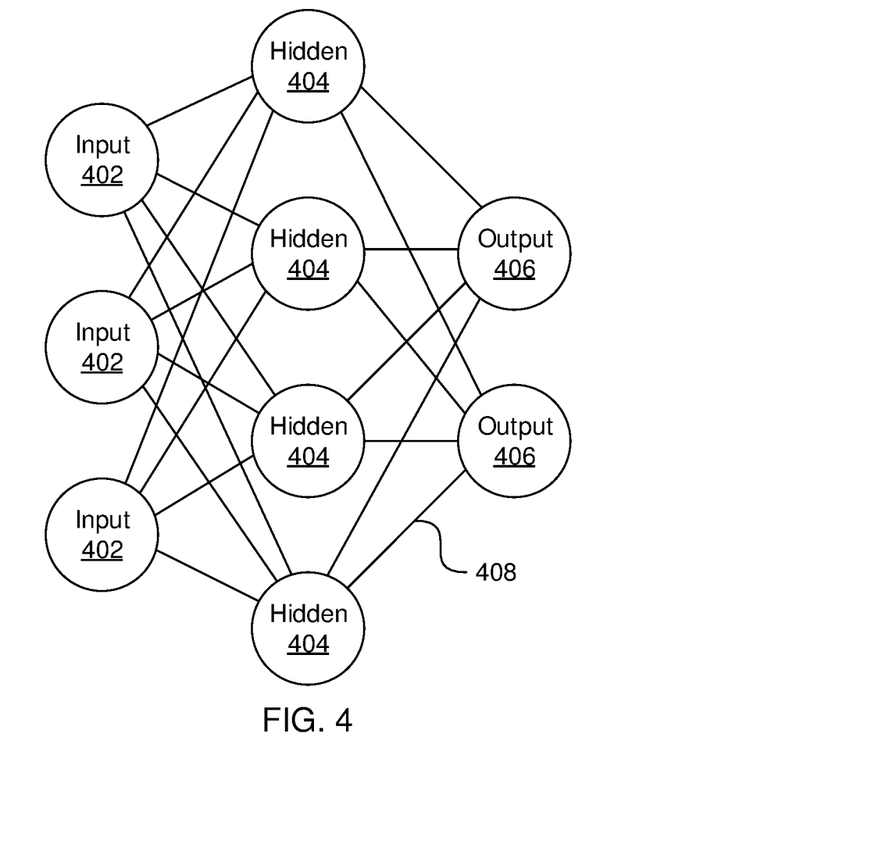
FIG. 4 is a diagram of an artificial neural network in accordance with an embodiment of the present invention.

Referring now to FIG. 4, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 402 that provide information to one or more "hidden" neurons 404. Connections 408 between the input neurons 402 and hidden neurons 404 are weighted and these weighted inputs are then processed by the hidden neurons 404 according to some function in the hidden neurons 404, with weighted connections 408 between the layers. There may be any number of layers of hidden neurons 404, and as well as neurons that perform different functions. There exist different neural network structures as well, such as convolutional neural network, maxout network, etc. Finally, a set of output neurons 406 accepts and processes weighted input from the last set of hidden neurons 404.

This represents a "feed-forward" computation, where information propagates from input neurons 402 to the output neurons 406. Upon completion of a feed-forward computation, the output is compared to a desired output available from training data. The error relative to the training data is then processed in "feed-back" computation, where the hidden neurons 404 and input neurons 402 receive information regarding the error propagating backward from the output neurons 406. Once the backward error propagation has been completed, weight updates are performed, with the weighted connections 408 being updated to account for the received error. This represents just one variety of ANN.

Figure 5:
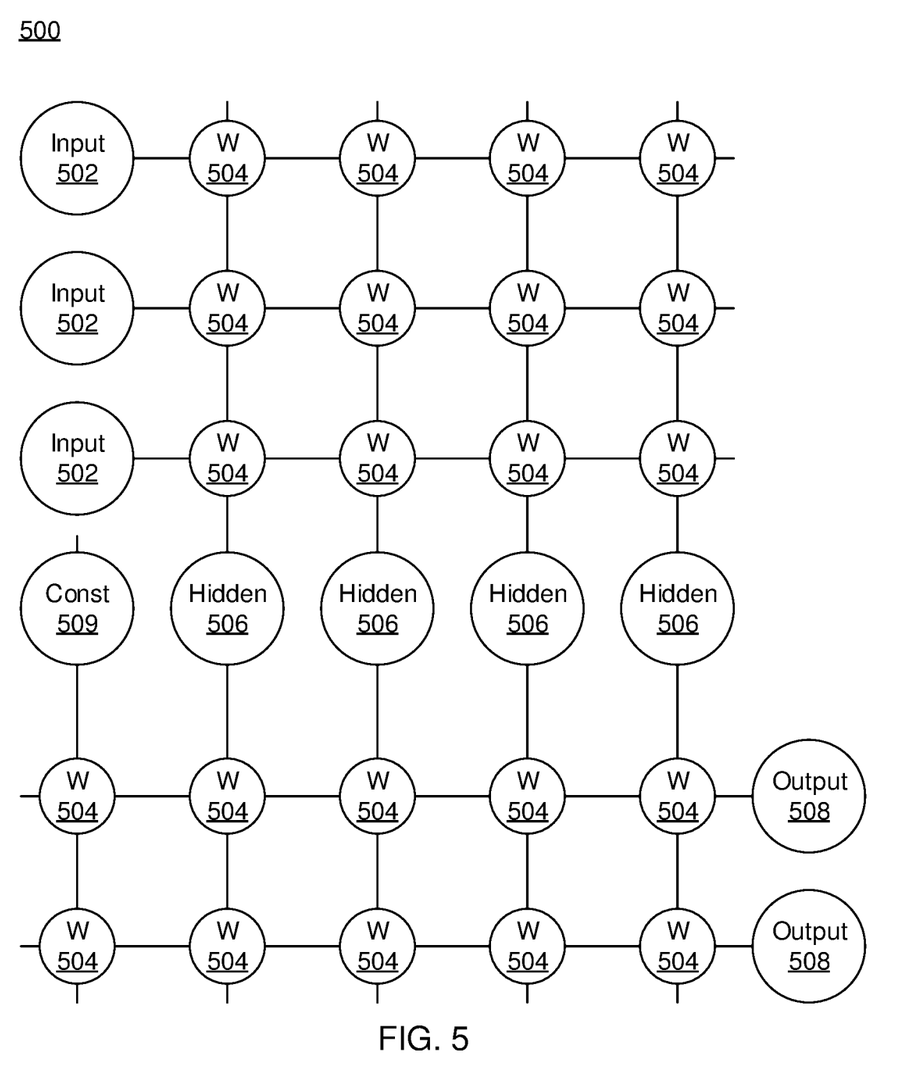
FIG. 5 is a detailed diagram of a neural network architecture in accordance with an embodiment of the present invention.

Referring now to FIG. 5, an ANN architecture 500 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include recurrent, convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 502 each provide an input signal in parallel to a respective row of weights 504. The weights 504 each have a respective settable value, such that a weight output passes from the weight 504 to a respective hidden neuron 506 to represent the weighted input to the hidden neuron 506. In software embodiments, the weights 504 may simply be represented as coefficient values that are multiplied against the relevant signals. The signals from each weight adds column-wise and flows to a hidden neuron 506.

The hidden neurons 506 use the signals from the array of weights 504 to perform some calculation. The hidden neurons 506 then output a signal of their own to another array of weights 504. This array performs in the same way, with a column of weights 504 receiving a signal from their respective hidden neuron 506 to produce a weighted signal output that adds row-wise and is provided to the output neuron 508.

It should be understood that any number of these stages may be implemented, by interposing additional layers of arrays and hidden neurons 506. It should also be noted that some neurons may be constant neurons 509, which provide a constant output to the array. The constant neurons 509 can be present among the input neurons 502 and/or hidden neurons 506 and are only used during feed-forward operation.

During back propagation, the output neurons 508 provide a signal back across the array of weights 504. The output layer compares the generated network response to training data and computes an error. The error signal can be made proportional to the error value. In this example, a row of weights 504 receives a signal from a respective output neuron 508 in parallel and produces an output which adds column-wise to provide an input to hidden neurons 506. The hidden neurons 506 combine the weighted feedback signal with a derivative of its feed-forward calculation and stores an error value before outputting a feedback signal to its respective column of weights 504. This back propagation travels through the entire network 500 until all hidden neurons 506 and the input neurons 502 have stored an error value.

During weight updates, the stored error values are used to update the settable values of the weights 504. In this manner the weights 504 can be trained to adapt the neural network 500 to errors in its processing. It should be noted that the three modes of operation, feed forward, back propagation, and weight update, do not overlap with one another.

Figure 6:
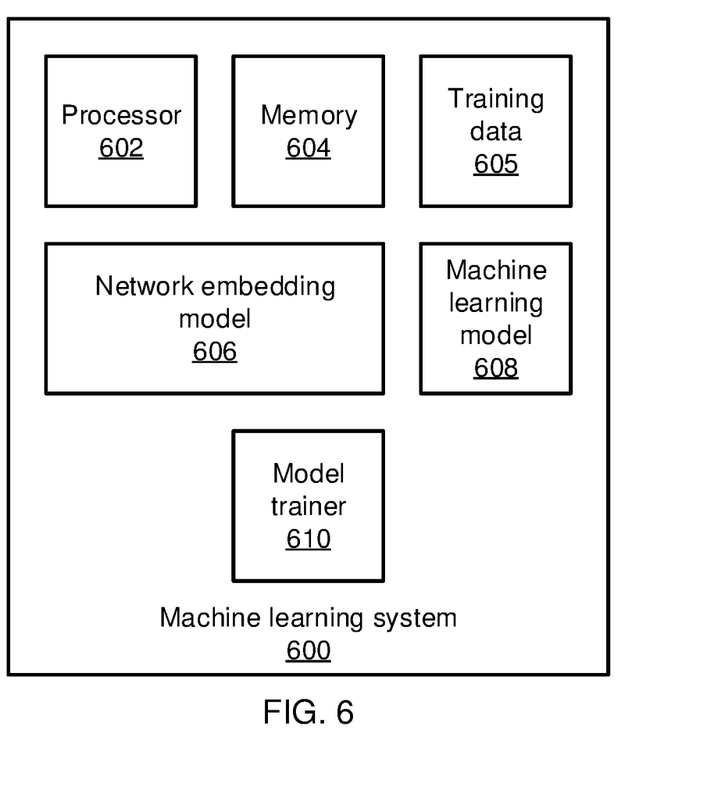
FIG. 6 is a block diagram of a machine learning system that uses a network embedding model that captures network topology information and network attribute information in accordance with an embodiment of the present invention.

Referring now to FIG. 6, a machine learning system 600 is shown. The system 600 includes a hardware processor 602 and a memory 604. Training data 605 is stored in the memory 604 and can include training data for the network embedding model 606 and the machine learning model 608. The respective models may be implemented as, e.g., neural network models. A model trainer 610 trains each of the models using the respective training data.

The machine learning model 608 is configured to perform some machine learning task using inputs that include a network embedding. The network embedding is generated by the network embedding model 606. Because the network embedding model 606 forms representations of input network vertices using both network topology and attribute information, the representations formed by the network embedding model 606 provide superior results when used as inputs to the machine learning model 608.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for determining a network embedding, comprising:
training a network embedding model using a processor, based on training data that includes topology information for networks and attribute information relating to vertices of the networks, by generating random walk sequences on a network to encode in a network topology space and in a network attribute space;
generating an embedded representation using the trained network embedding model to represent an input network, with associated attribute information, in a network topology space; and
performing a machine learning task using the embedded representation as input to a machine learning model.

2. The method of claim 1, wherein training the network embedding model includes adversarial training of a first autoencoder configured to perform topology embedding and a second autoencoder configured to perform attribute embedding.

3. The method of claim 2, wherein the first autoencoder is a recurrent neural network autoencoder.

4. The method of claim 2, wherein the second autoencoder is a multilayer perceptron autoencoder.

5. The method of claim 2, wherein training the network embedding model comprises solving a joint optimization problem that includes a loss term for a topology reconstruction autoencoder, a loss term for an attribute reconstruction autoencoder, and a locality-preserving loss term.

6. The method of claim 5, wherein the joint optimization problem further includes a distance metric between a distribution in topology space and a distribution in attribute space.

7. The method of claim 6, wherein the distance metric is an earth mover distance.

8. The method of claim 1, further comprising training the machine learning model using a set of training data that includes network walk sequences that are embedded using the network embedding model.

9. The method of claim 1, wherein the machine learning task includes a task selected from the group consisting of network reconstruction, multi-label classification, and link prediction.

10. A system for determining a network embedding, comprising:
   a model trainer configured to train a network embedding model using training data that includes topology information for networks and attribute information relating to vertices of the networks and to generate random walk sequences on a network to encode in a network topology space and in a network attribute space, wherein the network embedding model is configured to generate an embedded representation to represent an input network, with associated attribute information, in a network topology space; and
   a machine learning model configured to perform a machine learning task using the embedded representation output by the network embedding model as input.

11. The system of claim 10, wherein the model trainer is further configured to perform adversarial training of a first autoencoder of the network embedding model, configured to perform topology embedding, and a second autoencoder of the network embedding model, configured to perform attribute embedding.

12. The system of claim 11, wherein the first autoencoder is a recurrent neural network autoencoder.

13. The system of claim 11, wherein the second autoencoder is a multilayer perceptron autoencoder.

14. The system of claim 11, wherein the model trainer is further configured to solve a joint optimization problem that includes a loss term for a topology reconstruction autoencoder, a loss term for an attribute reconstruction autoencoder, and a locality-preserving loss term.

15. The system of claim 14, wherein the joint optimization problem further includes a distance metric between a distribution in topology space and a distribution in attribute space.

16. The system of claim 15, wherein the distance metric is an earth mover distance.

17. The system of claim 10, wherein the model trainer is further configured to train the machine learning model using a set of training data that includes network walk sequences that are embedded using the network embedding model.

18. The system of claim 10, wherein the machine learning task includes a task selected from the group consisting of network reconstruction, multi-label classification, and link prediction.

* * * * *